United States Patent
Weekly et al.

(10) Patent No.: US 9,652,894 B1
(45) Date of Patent: May 16, 2017

(54) AUGMENTED REALITY GOAL SETTER

(71) Applicant: Wells Fargo Bank, N.A., San Francisco, CA (US)

(72) Inventors: Lisa Weekly, Dallas, NC (US); Kourtney Eidam, Marietta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 84 days.

(21) Appl. No.: 14/278,139

(22) Filed: May 15, 2014

(51) Int. Cl.
*G06T 19/00* (2011.01)
*G06Q 30/06* (2012.01)
*G06Q 40/00* (2012.01)

(52) U.S. Cl.
CPC ....... *G06T 19/006* (2013.01); *G06Q 30/0643* (2013.01); *G06Q 40/00* (2013.01)

(58) Field of Classification Search
None
See application file for complete search history.

(56) References Cited

U.S. PATENT DOCUMENTS

| | | | | |
|---|---|---|---|---|
| 6,339,763 | B1 * | 1/2002 | Divine | G06F 17/30244 345/634 |
| 8,180,396 | B2 | 5/2012 | Athsani et al. | |
| 8,438,110 | B2 | 5/2013 | Calman et al. | |
| 2005/0144893 | A1 * | 7/2005 | Buzz | G06Q 10/06313 52/741.1 |
| 2007/0087913 | A1 * | 4/2007 | Jaquish | A63B 21/0023 482/91 |
| 2008/0033791 | A1 * | 2/2008 | Jones | G06Q 10/06 705/7.37 |
| 2008/0059267 | A1 * | 3/2008 | Hamilton | G06Q 10/00 705/7.15 |
| 2009/0237546 | A1 | 9/2009 | Bloebaum et al. | |
| 2009/0328223 | A1 * | 12/2009 | Medvedev | G06F 21/577 726/25 |
| 2010/0185529 | A1 | 7/2010 | Chesnut et al. | |
| 2011/0246926 | A1 * | 10/2011 | Newton | G06F 3/0481 715/772 |
| 2011/0258049 | A1 | 10/2011 | Ramer et al. | |
| 2012/0040799 | A1 * | 2/2012 | Jaquish | A63B 21/00047 482/9 |
| 2012/0058801 | A1 * | 3/2012 | Nurmi | G06T 19/006 455/566 |
| 2012/0136762 | A1 * | 5/2012 | Wissenbach | G06Q 40/12 705/30 |
| 2012/0229625 | A1 | 9/2012 | Calman et al. | |
| 2012/0230540 | A1 * | 9/2012 | Calman | G06K 9/00221 382/103 |
| 2012/0231424 | A1 | 9/2012 | Calman et al. | |
| 2012/0231814 | A1 | 9/2012 | Calman et al. | |

(Continued)

*Primary Examiner* — Michael J Cobb
(74) *Attorney, Agent, or Firm* — Merchant & Gould P.C.

(57) ABSTRACT

A method implemented on an augmented reality (AR) device includes receiving an image of an object at the AR device. The image is displayed on a display screen of the AR device. One or more activating actions are received at the AR device. As a result of the one or more activating actions: the object is identified, an identity of the object is sent to a server computer, information is received from the server computer regarding a percentage of completion towards a goal relating to the object and a representation of the percentage of completion towards the goal relating to the object is visually displayed on the image of the object.

15 Claims, 7 Drawing Sheets

(56) References Cited

U.S. PATENT DOCUMENTS

| | | |
|---|---|---|
| 2012/0232937 A1 | 9/2012 | Calman et al. |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0233003 A1* | 9/2012 | Calman ............... G06Q 30/06 705/16 |
| 2012/0233015 A1 | 9/2012 | Calman et al. |
| 2012/0233032 A1 | 9/2012 | Calman et al. |
| 2012/0233072 A1 | 9/2012 | Calman et al. |
| 2012/0242698 A1* | 9/2012 | Haddick ............ G02B 27/0093 345/633 |
| 2013/0033522 A1 | 2/2013 | Calman et al. |
| 2013/0046702 A1* | 2/2013 | Ross ................. G06Q 30/0201 705/319 |
| 2013/0116679 A1* | 5/2013 | Van der Weide .. A61B 18/1815 606/33 |
| 2013/0166332 A1 | 6/2013 | Hammad |
| 2013/0206830 A1* | 8/2013 | Kugel ................. G06Q 10/08 235/375 |
| 2013/0286048 A1 | 10/2013 | Sternitzke |
| 2013/0325491 A1* | 12/2013 | Ferrari ................. G06Q 50/22 705/2 |
| 2013/0346132 A1* | 12/2013 | Whitelaw ........ G06Q 10/06311 705/7.15 |
| 2014/0022281 A1* | 1/2014 | Georgeson ........... B64F 5/0045 345/633 |
| 2014/0214443 A1* | 7/2014 | Duffy .................. G06Q 50/22 705/2 |
| 2014/0267399 A1* | 9/2014 | Zamer ................. G06T 19/006 345/633 |
| 2015/0052479 A1* | 2/2015 | Ooi .................. G06F 3/04815 715/810 |
| 2015/0168365 A1* | 6/2015 | Connor ................. G01N 33/02 356/51 |
| 2015/0293677 A1* | 10/2015 | Fong .................. H04L 65/4084 715/717 |

\* cited by examiner

AUGMENTED REALITY GOAL SETTER

BACKGROUND

Augmented reality is a technology in which a person's conception of reality can be enhanced, typically through augmented sound, video or graphics displays. The augmentation is typically implemented via various technologies, such as a headset that may be worn by the person. One or more augmented views may be presented to the person through the headset.

The augmented reality headset typically includes a wearable computer and an optical display mounted to the headset. The wearable computer may include a wireless telecommunication capability, permitting a wireless connection from the wearable computer to a server computer. Because of the wireless telecommunication capability, the augmented reality headset may be used to interact with the server computer to accomplish various tasks.

SUMMARY

Embodiments of the disclosure are directed to a method implemented on an augmented reality (AR) device, the method comprising: receiving an image of an object at the AR device; displaying the image on a display screen of the AR device; receiving one or more activating actions at the AR device; and as a result of the one or more activating actions: identifying the object; sending an identity of the object to a server computer; receiving information from the server computer regarding a percentage of completion towards a goal relating to the object; and visually displaying on the image of the object a representation of the percentage of completion towards the goal relating to the object.

In another aspect, an augmented reality (AR) electronic device comprises a processor; a camera; memory; and a display area, wherein, the AR electronic device is configured to display an image representing progress towards a goal, the image comprising an object to be purchased and an overlay covering at least part of the image of the object to be purchased, the overlay being of one or more colors or patterns, an extent to which the overlay covers the at least part of the image of the object to be purchased representing a percentage of a completion of a goal relating to the object to be purchased.

In yet another aspect, an augmented reality (AR) device comprises: a processing unit; and system memory, the system memory including instructions which, when executed by the processing unit, cause the AR device to: receive an image of an object; display the image on a display screen of the AR device; receive one or more activating actions at the AR device, each of the one or more activating actions being a verbal command, the one or more activating actions initiating a display on the AR device of progress towards a savings goal; and as a result of the one or more activating actions: obtain an identification for the object, the identification being obtained at the AR device via optical recognition software; identify a user of the AR device, an identification of the user of the AR device being performed via one or more of facial recognition, retinal scan, voice print or finger print scan; send an identity of the user and an identity of the savings goal to a server computer; receive information from the server computer regarding a percentage of completion towards the savings goal; and visually display a pattern or a color on a portion of the object, the pattern or the color covering up the portion of the object, the portion of the object being covered up with the pattern or color corresponding to the percentage of completion towards the savings goal.

The details of one or more techniques are set forth in the accompanying drawings and the description below. Other features, objects, and advantages of these techniques will be apparent from the description, drawings, and claims.

DETAILED DESCRIPTION

Figure 1:
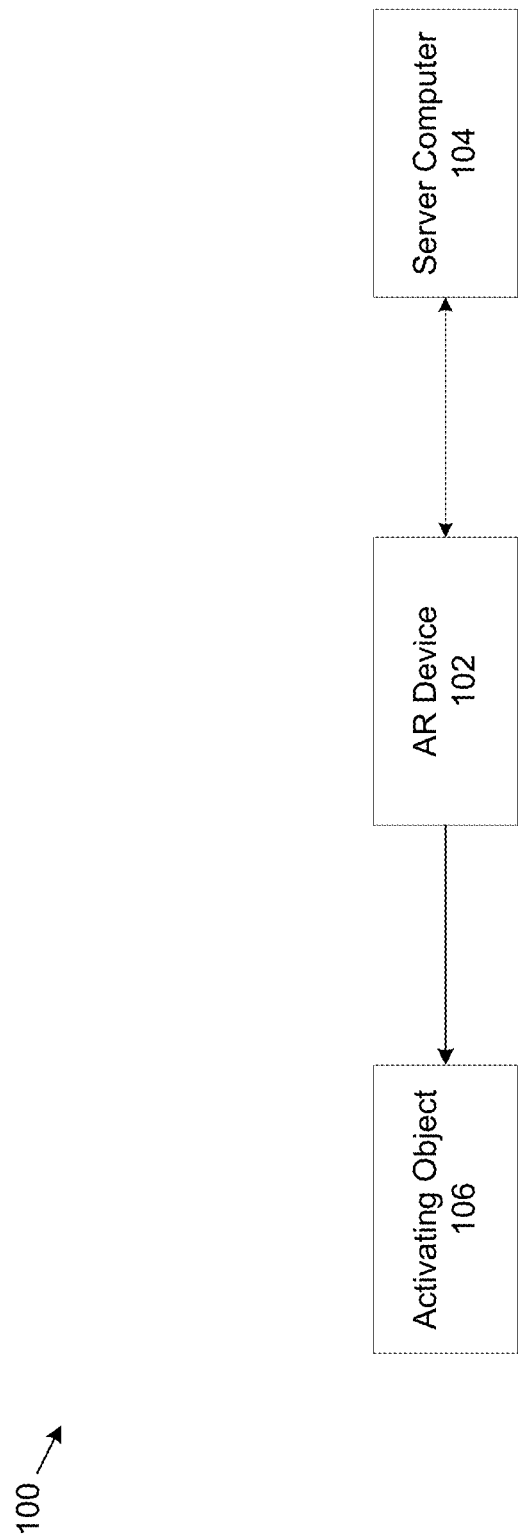
FIG. 1 shows an example system that may be used for an augmented reality (AR) progress display.

The present disclosure is directed to systems and methods for using augmented reality (AR) to display progress towards a goal. The goal may be to purchase an item, such as a car, a house or a boat, to save for a specific event, for example a vacation or college, or a non-financial goal such as progress on an exercise program. Other types of goals are possible.

The AR device displays progress towards the goal by displaying an image of an object associated with the goal and coloring or shading the object to indicate progress towards the goal. For example, if the goal is to purchase a car, the AR device may display an image of a car. The image may be colored or shaded to indicate progress towards the goal of buying the car. For example, if 50 percent of an amount of money needed to purchase the car has been saved, one half of the image of the car may be colored or shaded and the color half of the image of the car is not colored or shaded. The 50 percent of the image that is colored or shaded indicates that there has been 50% progress towards the goal of purchasing the car.

The systems and methods are generally described for an AR device that may be worn or carried by a user. An example of an AR device that may be worn by the user is an AR headset. An example of an AR device that may be carried by the user is a smart telephone or tablet computer that includes AR components such as a processor, display and camera and an AR software application.

The AR headset includes a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, in some implementations, the wearable computer also includes biometric capability such as facial recognition, retinal scan capability, finger print and voice print capability.

One type of AR headset described in this disclosure is a smart glass type of headset, similar to eyeglasses, which may be worn by the user. The user may view AR images in the glass portion of the headset. An example of a smart glass headset is Google Glass, from Google Inc. of Mountain View, Calif.

In order for the AR device to display progress towards the goal, the user of the AR device needs to be identified. Once identified, account information for the user may be obtained. The user of the AR device is typically identified via one of several biometric methods including, facial recognition, retinal scan capability, finger print or voice print. Other methods for identifying the user may be used.

Using the systems and methods, information related to the goal is typically entered into a digital dashboard. The digital dashboard is a user interface of a computing device, for example a financial services software application accessible from a smart telephone or tablet computer. As explained in more detail later herein, a user may select a goal, select an amount to save for the goal and select an object from which to display progress towards the goal. For example, if the goal is to purchase a house, a picture of a house may be selected. If the goal is to purchase a car, a picture of a car may be selected. If the goal is to save for a vacation, a picture of a vacation scene may be selected. The picture selected is typically a generic representation for the object. For example, the picture of the car, house or vacation scene may be a picture of any car, house or vacation scene and need not be the actual car, house or vacation corresponding to the goal.

Using the digital dashboard, the user may also select an activating object. The activating object is an object, which when viewed by the AR device causes a display showing progress towards the goal to be displayed on the AR device. More than one activating object may be used for a goal. For example, if the goal is to purchase a car, the activating object may be a car, a key, or both the car and the key. Similarly, if the goal is to purchase a house, the activating object may be a house. However, each activating object may only be used for one goal. For example the key may be the activating object for the car or the house, but not for both. In a typical implementation, the activating object is a three-dimensional object such as an actual car, house or key as viewed via a camera on the AR device. In other implementations, the activating object may be a static two-dimensional object, such as a picture or photo of a car or house.

In an example implementation, the user may configure the digital dashboard for a goal of purchasing a car. In this example, a car and a key are both configured to be activating objects. If the user is walking down a street and sees a car, the viewing of the car may remind the user that he/she is saving to purchase a car and the user may be curious as to a current status of this goal. If the user is wearing or carrying an AR device, the user may view the car with the AR device and also issue an activating verbal command, such as "goal getter." These actions may cause the AR device to display a colored or shaded overlay on the three-dimensional image of the viewed car showing progress towards the goal. In some implementations, a second activating command may be used—for example "car." The second activating command may be used, for example, if optical recognition software on the AR device does not recognize the activating object. In other implementations other activating actions besides verbal commands may be used. For example, the user may initiate the display of progress towards the goal by touching one or more areas on the display screen of the AR device.

In another variation of this example implementation, the user may be sitting in his/her office and think about the car to be purchased. Rather than having to find an actual car to trigger the display, the user may view a key with the AR device and issue the same activating verbal commands, such as "goal getter" or "goal getter" and "car." These actions also cause the AR device to display a representation of a percentage completion towards a goal. However, this time the representation of the percentage completion is shown on the viewed key. For example, a color or shaded overlay appears on the image of the key showing progress towards the goal. An extent to which the image of the key is colored or shaded indicates the percentage completion towards the goal.

By configuring the digital dashboard and using the activating objects, the user may see progress towards one or more goals simply by viewing the activating object. This is easier than needing to login to a software application in order to view the progress towards the goal. In addition, the use of an activating object and the display of the color or shaded image on the AR device may be considered to be more exciting or fun to certain users, particularly young and savvy technology users, than to login to a software application to obtain this progress information.

FIG. 1 shows an example system 100 that supports an AR goal getter progress display. The example system 100 includes an AR device 102, a server computer 104 and an activating object 106. The AR device 102 may be an AR headset or a smart telephone or tablet computer having a processor, display, camera and AR software application. The server computer 104 is typically a server computer associated with a financial institution, such as a bank. The activating object 106 is an object that when viewed by the AR device 102 causes a progress display for the goal to be displayed on the AR device 102. Examples of activating objects are a car, a house, a key, a vacation scene and a book bag. Other activating objects are possible.

Figure 2:
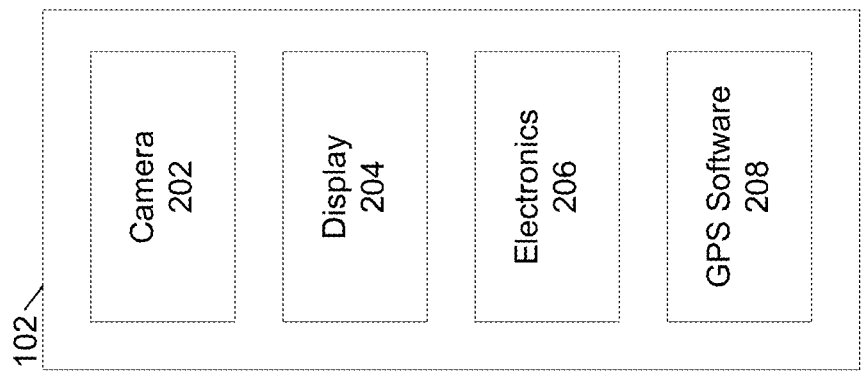
FIG. 2 shows example modules of the AR device of FIG. 1.

FIG. 2 shows example modules 200 of AR device 102. The example modules 200 include a camera 202, a display 204, electronics 206 and GPS software 208. The camera 202 is a camera that is built-in to AR device 102. Display 204 is a display that is also built-in to AR device 102. Electronics 206 includes an electronic computing device with wireless capability. The wireless capability may include Bluetooth, radio frequency identification (RFID) or similar types of wireless capability. GPS software 208 is typically a software application that may be installed on the mobile electronic device. When AR device 102 is an AR headset, camera 202, display, 204, electronics 206 and GPS software 208 are part of the AR headset.

The AR software application runs on the electronic computing device. The AR software application is typically a financial software application that supports online banking applications. Example online banking applications include account access, bill pay, electronic banking statements, etc. The AR software application also provides support for the digital dashboard, as discussed later herein. In addition the AR software application supports AR display of financial and other data on the display screen of the AR device 102. The AR software application also supports biometric authentication for the user, generally one or more of facial recognition, retinal scan, finger print scan or voice recognition. Biometric information obtained at the AR device 102 is compared against a biometric profile of the user that is typically available on the AR device 102.

Figure 3:
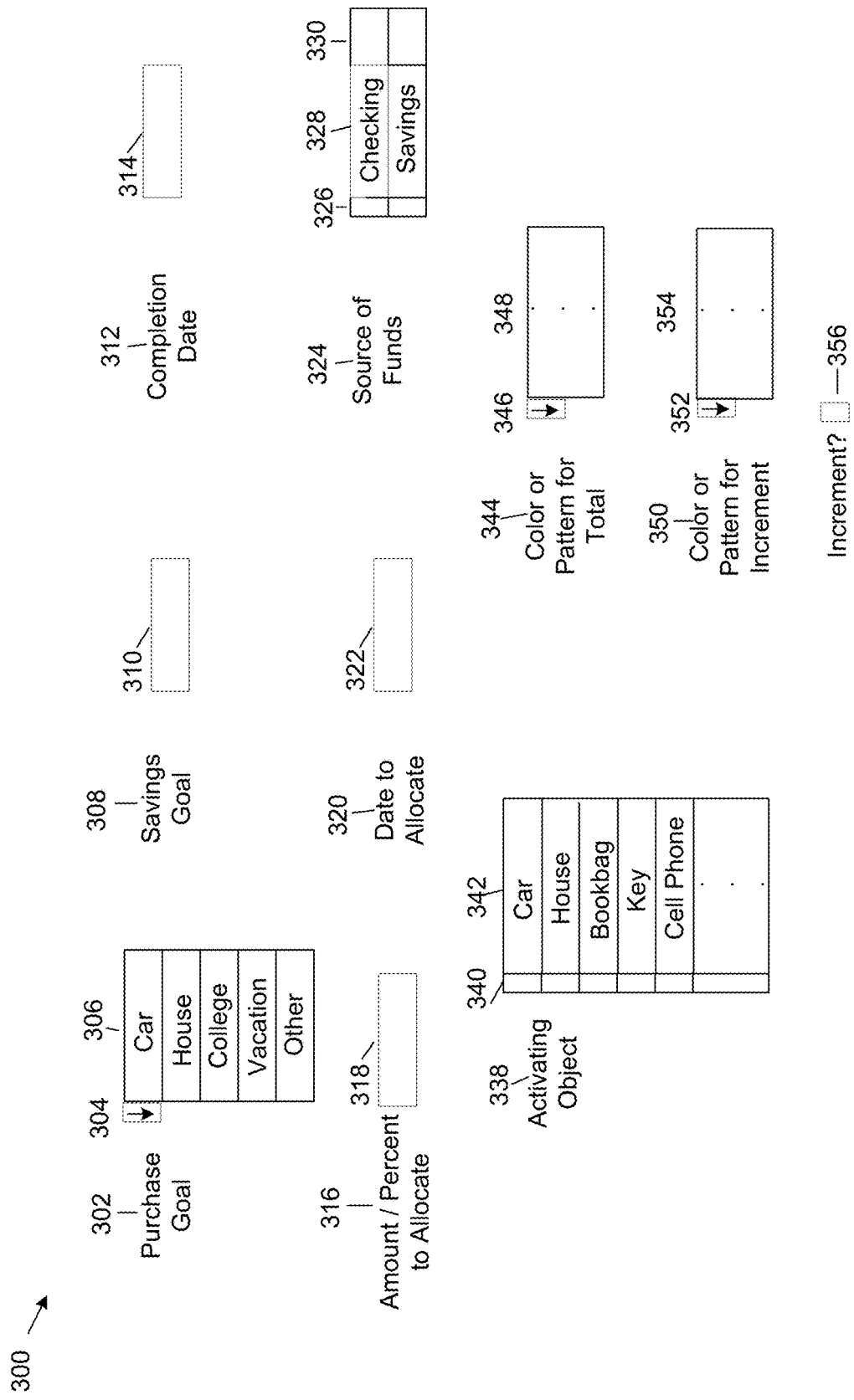
FIG. 3 shows an example user interface for a digital dashboard.

FIG. 3 shows an example user interface 300 for a digital dashboard. The example user interface 300 includes a purchase goal 302, a savings goal 308, a completion date 312, an amount/percent to allocate 316, a date to allocate 320, a source of funds 324, an activating object 338, a color or pattern for a total 344, a pattern or color for an increment 350 and an increment checkbox 356. More, fewer, or different fields may be included on the user interface 300.

The example purchase goal 302 includes a pull-down list box 304. The pull-down list box 304 lists the names of purchase goals. Example purchase goals 306 that may be selected via the pull-down list box 304 include a car, a house, college, a vacation or other. More, fewer or other purchase goals 306 may be selected.

The example savings goal 308 is a dollar amount to save for a selected purchase goal 302. The user may enter the dollar amount to save into an edit box 310.

The example completion date 312 is typically a date by which the user expects to have completed savings for the savings goal 308. The user may enter the completion date into an edit box 314.

The example amount/percent to allocate 316 is a dollar amount or a percentage that the user decides to apply to the savings goal 308. The date to allocate 320 is a date on which the dollar amount or percentage is to be allocated to the savings goal 308. Allocation may comprise allocating a percentage of money for the savings goal 308 from a source of funds, for example the user's savings or checking account. Allocation may also comprise transferring a percentage of money to a special savings account assigned for the savings goal 308. The date to allocate 320 may be a specific date, a specific day of a month, a specific day or a week or some other interval or date the user chooses.

When the user allocates a percentage of money from the user's savings or checking account to be applied to the savings goal 308, the user builds up a reserve fund within the user's savings or checking account. This means that less of the user's funds are available for other purchases. When the user makes a purchase, for example via a debit card, that may cause the user's available funds to be exceeded, the user may receive an alert, for example an email or text message, indicating that the user's available funds are to be exceeded and that the reserve funds will need to be used.

Allocation of the percentage of money using the reserve fund may help the user budget for a goal without the user or bank needing to set up with or deal with a special savings account. However, in some cases users may prefer to set up a special savings account in which to allocate funds towards a savings goal.

The user may enter a dollar amount or a percentage to allocate into an edit box 318. When a dollar amount is entered into the edit box 318, the dollar amount may be allocated from the source of funds to the reserve fund or the special savings account. When a percentage is entered into the edit box 318, a percentage of an amount in the source of funds may be allocated to the reserve fund or to the special savings account. For example, if the source of funds is a checking account, and the user enters a percentage into the edit box 318, a percentage of the amount in the checking account may be allocated towards the savings goal 308 on the date to allocate 320, as entered by the user in edit box 322. For example, if the user entered 5 percent into the edit box 318 and the user had $1,000 in the user's checking account, $50 would be allocated from the user's checking account to the reserve fund or transferred to the special savings account on the date to allocate 320.

In some implementations, the special savings account may be a savings account that the user opened to be dedicated to savings for special goals. In other implementations, the special savings account may be a temporary account associated with a specific savings goal for the user. The temporary account would be displayed when the user accesses his/her bank account and the user could transfer money from the temporary account to any other user account. However, when the user's goal is met, the user may transfer all the money saved out of the temporary account and the temporary account may be deleted. In other implementations, the special savings account may not be used. For example, money may be directly transferred into the user's checking account.

In some implementations, an amount/percent to allocate 316 may be automatically calculated. In these implementations, when a savings goal 308 and a completion date 312 are entered, the systems and methods may calculate an amount or percent of money needed to be obtained from a source of funds in order for the purchase goal 302 to be reached by the completion date 312. For example, if the user gets paid twice a month, a certain percentage or amount may be automatically withdrawn from the user's checking account each pay period in order to meet the purchase goal 302.

The source of funds 324 identifies where the money to be saved from the savings goal 308 is to be allocated from. For the example user interface 300, a source of funds 328 is selected via a check box 326. As shown, in FIG. 3, the source of funds 328 may be from checking, savings or both. To select a specific source of funds, the user selects the checkbox next to the specific source of funds. For example, the user may select the checkbox for checking, the checkbox of savings or both checkboxes. When the user selects multiple sources, a percentage edit box 330 is enabled. The user then enters a percentage to be allocated from each source of funds, for example 50% from checking and 50% from savings.

Other sources of funds 328 (not shown) in addition to checking and savings are possible. For example, one additional source may be a paycheck. For example, the user may choose to save a percentage from each paycheck toward the savings goal 308.

The activating object 338 is an object that is associated with the purchase goal 302. When the activating object 338 is viewed via the camera 202 on the AR device 102 and the appropriate activating command is issued, the AR device 102 displays a progress towards the purchase goal 302 on the viewed activating object 338. The progress is typically shown via a color or shading overlay on the activating object 338, as discussed in more detail later herein. However, the progress may also be shown in other ways, for example via a progress line across the activating object 338. A length of the progress line may correspond to a percentage progress towards the goal.

For the example user interface 300, the activating object 338 is selected via check boxes 340 within a menu 342 of objects. An activating object 338 is selected by selecting one or more checkboxes. Example choices for the activating object include a car, a house, a winter or summer vacation scene, a book bag, a key and a cell phone. More, fewer or different activating objects.

Typically, at least one activating object 338 is similar to or the same as the purchase goal 302. For example, if the purchase goal 302 is a car, at least one activating object 338 may also be a car. For example, when a car is selected for the activating object 338 and the user views a car with the AR device and uses the appropriate verbal command to initiate the display, a display of progress towards the purchase goal 302 is shown on the image of the car on the AR device 102.

However, a user may want to trigger the display of progress without needing to go outside and look at a car. Therefore, the user may select a second activating object 338, for example a key, for the car. Then, when the user views a key with the AR device and uses the appropriate verbal command to initiate the display, the progress is displayed on the second activating object 338. For example, when the key is selected as an activating object 338 and the user views the key and uses the appropriate verbal command to initiate the display, the key fills up with a color or pattern indicating the percentage completion towards the purchase goal 302.

Similarly, the user may select a book bag or similar object when the purchase goal 302 is saving for college or the user may select a cell phone as an activating object for any purchase goal 302. In general, the user may select any activating object that the user typically carries, such as a cell phone, a key or a book bag, to trigger a display of progress towards the goal on the activating object 338. When the user selects these activating objects, the progress display is typically shown on the activating objects, for example on the cell phone, key or book bag.

The color or pattern for total 344 is a color or pattern to be used on the activating object 338 to indicate total progress to date towards the purchase goal 302. For example, if a solid color is selected, the selected color overlays an image of the activating object 338 to show current total progress towards the purchase goal 302, as explained later herein. For the example user interface 300, the color or pattern for total 344 is selected via a pull-down list box 346. One of a plurality of colors or patterns 348 may be selected.

The systems and methods also permit incremental progress towards the purchase goal 302 to be displayed. When incremental progress is displayed, progress towards the purchase goal 302 between time periods may be displayed. The color or pattern for increment 350 is a color or pattern to be used on the activating object 338 to display incremental progress towards the purchase goal. In some implementations, the color or pattern for increment 350 may be used alternately with the color or pattern for total 344 to show incremental progress towards a goal, as explained later herein. For the example user interface 300, the color or pattern for increment 350 is selected via a pull-down list box 352. One of a plurality of colors or patterns 354 may be selected. In some implementations (not shown), the user interface 300 may permit a selection of multiple incremental colors or patterns.

An increment checkbox 356 may be selected to activate a display of an incremental color or pattern. For the example user interface 300, when the increment checkbox 356 is not selected, progress towards purchase goal 302 is displayed using the color or pattern for total 344. When the increment checkbox 356 is selected, progress towards purchase goal 302 is displayed using both the color or pattern for total 344 and the color or pattern for increment 350, as explained later herein.

Figure 4:
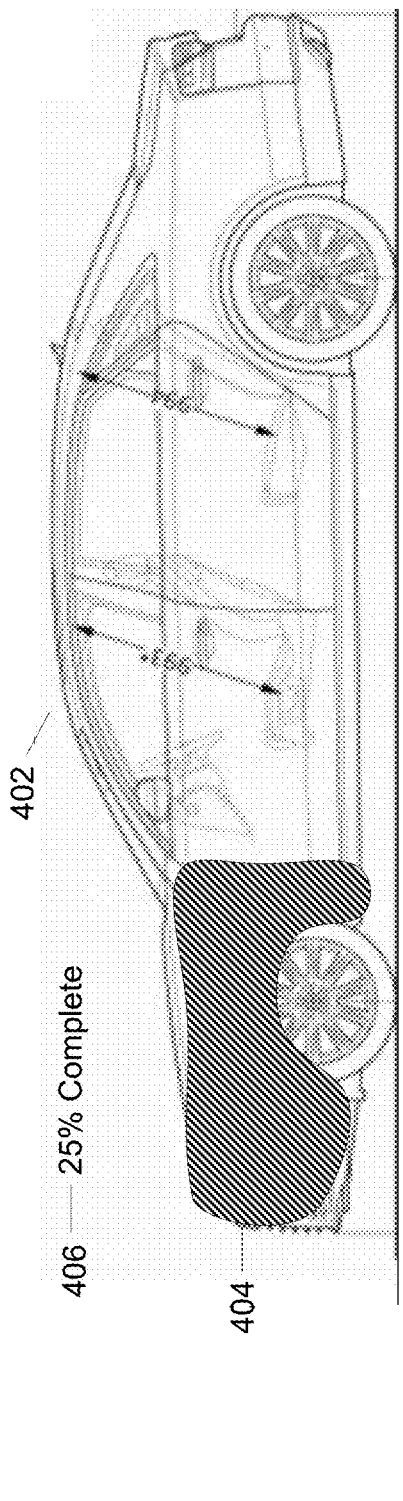
FIG. 4 shows an example progress display for a purchase goal of a car.

FIG. 4 shows an example progress display 400 for a purchase goal of a car. For the progress display 400, a pattern is used to show a current total progress towards the purchase goal. The progress display 400 shows an image of a car 402. Superimposed on the image of the car is a pattern overlay 404 which covers a portion of the car. The portion of the car corresponds to a percent of current total progress towards the purchase goal. The progress display 400 also provides a text display 406 which indicates that the purchase goal is 25% complete, meaning that 25% of the savings goal 308 has been saved. As shown, the pattern overlay 404 covers approximately 25% of the surface of the car, providing a visual indication of the 25% progress towards the savings goal 308.

Figure 5:
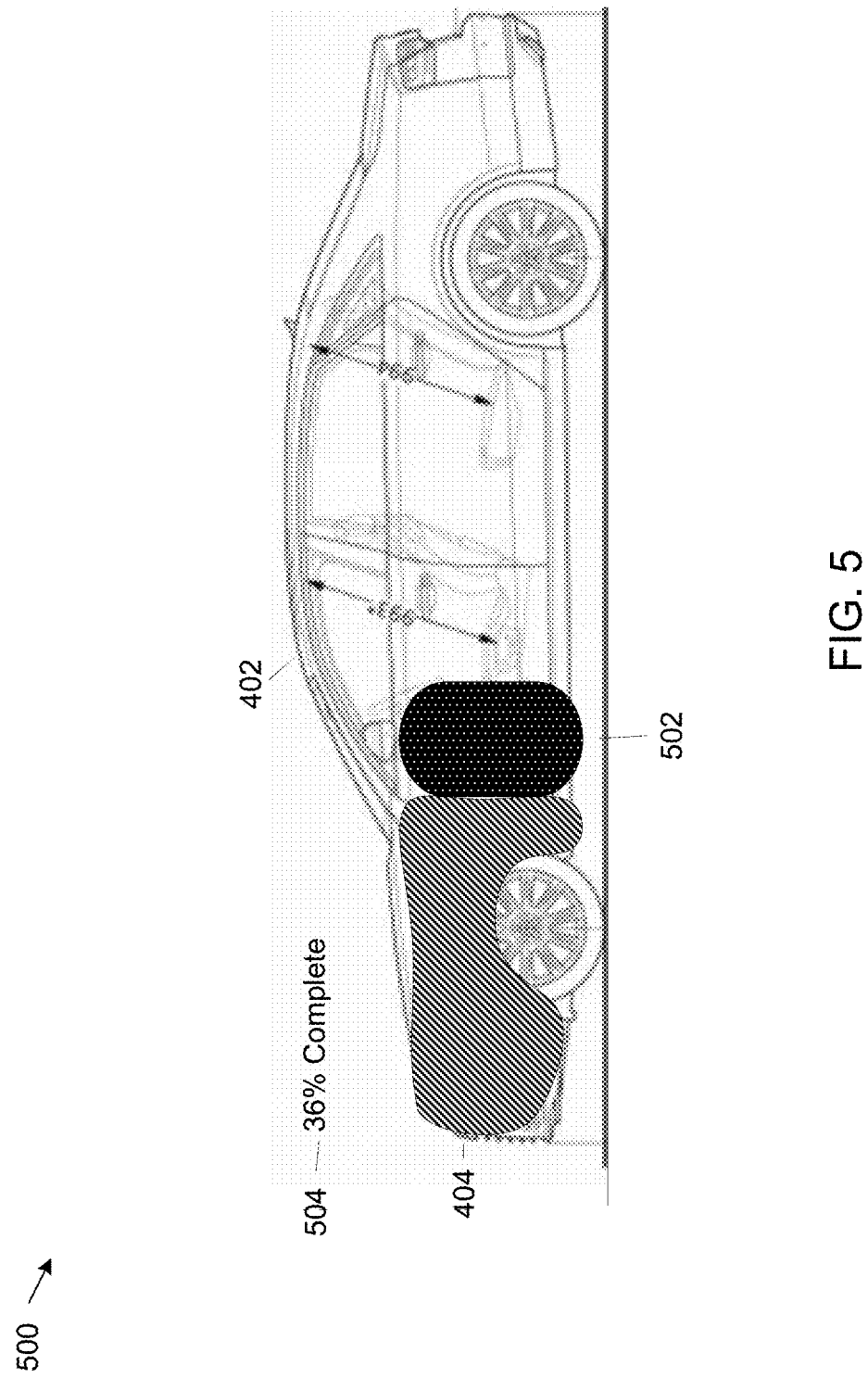
FIG. 5 shown another example progress display for a purchase goal of a car.

FIG. 5 shows an example incremental progress display 500 for the purchase goal of the car. Progress display 500 shows an incremental progress from the progress shown in progress display 400. Progress display 500 includes image of the car 402 and pattern overlay 404, showing previous progress. Progress display 500 also shows that an additional amount has been saved towards the savings goal 308. The additional amount is represented by pattern overlay 502. Pattern overlay 502 is a different pattern than pattern overlay 404 so that the progress can be easily recognized. Progress display 500 also provides a text display 504 which indicates that the purchase goal is 36% complete.

Pattern overlay 502 represents an incremental savings amount from a particular event. In some implementations, the event may represent a calendar date, such as the first day of a month. In other implementations, the event may represent a new payment to savings. For example, pattern overlay 404 may represent a percent completion towards savings goal 308 up to a last payment to savings and pattern overlay 502 may represent an added percent completion towards savings goal 308 as a result of the last payment to savings. In this case, pattern overlay 502 would indicate that an additional 11% was added towards savings goal 308 as a result of the last payment. The additional 11% represents a difference between the current 36% towards savings goal 308 and the previous 25% towards the savings goal. Other events are possible.

In some implementations, a different pattern or color is displayed each time an event occurs. In some implementations, there may be two distinct patterns or colors, for example pattern overlay 404 and pattern overlay 502, that are displayed alternately each time a payment event occurs. In other implementations, there may be a plurality of different patterns or colors that are used, each event being represented by a different pattern or color.

Progress displays similar to progress displays 400 and 500 may be used for other purchase goals 302. For example, pattern or color overlays may be used to show progress on an image of a house, a college campus, a vacation scene, etc., depending on the purchase goal 302. In some implementations, progress indications other than colors or shading may be used. For example, in some implementations, a progress line may be drawn through the activating object 338. A length of the progress line may represent progress towards the purchase goal 302.

The systems and methods may also be used for non-financial applications in addition to or in lieu of purchase goals. Some example non-financial applications include progress of a team in accomplishing a goal, progress towards completing tasks on a to-do list, progress towards an exercise goal, etc. Other non-financial goals are possible.

With non-financial goals, different objects to display and different activating objects may be used. For example, for a project goal, the object to display may be a computer and an activating object may be a pencil or a pen. Similarly for an exercise goal, an object to be displayed may be an image of a runner and the activating object may be a running shoe. Other objects to display and other activating objects are possible. In addition, for non-financial goals different events may be used for incremental progress displays. For example, each exercise session may be used as an event.

Figure 6:
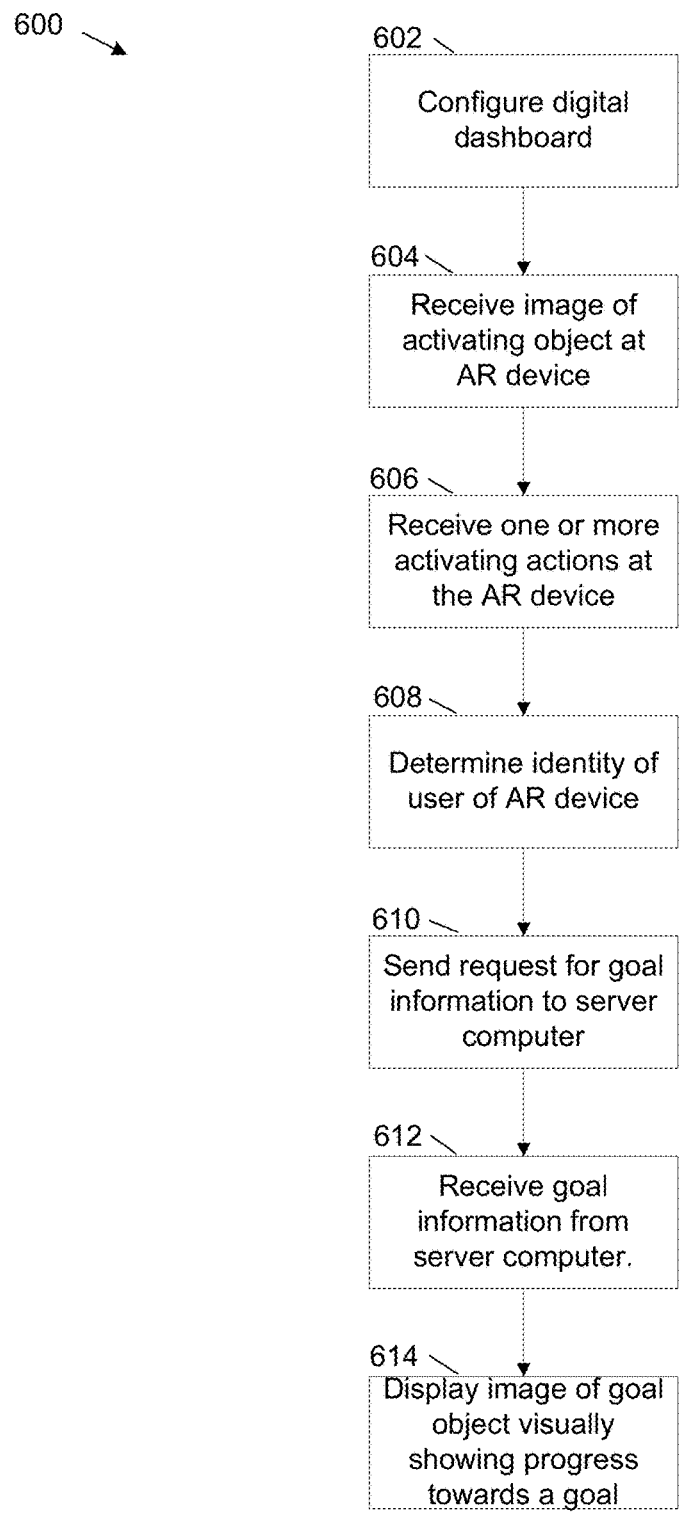
FIG. 6 shows a flowchart for an example method implemented on the AR device of FIG. 1 for displaying progress towards a goal on the AR device of FIG. 1.

FIG. 6 shows a flowchart of a method 600 implemented on AR device 102 for displaying progress towards a goal. In this example, the AR device 102 is an AR headset device such as Google Glass.

At operation 602, a digital dashboard is configured, for example the digital dashboard corresponding to user interface 300. The digital dashboard is typically configured via a financial software application on a computing device of the user. The computing device may be a smart telephone, tablet computer, laptop computer, desktop computer or other similar computing device.

At operation 604, the user views an activating object with AR device 102. The activating object may be any object configured on the digital dashboard to initiate a display of progress towards the goal. When the activating object is viewed on AR device 102, an image of the activating object is received at the camera 202 of AR device 102. In method 600, optical recognition software on AR device 102 identifies the image of the activating object. In some implementations, the image of the activating object may be sent to a server computer, for example server computer 104 for identification.

At operation 606, one or more activating actions are received at AR device 102. The activating action is typically a verbal command used to initiate the display of progress towards the goal on AR device 102. The verbal command is typically pre-programmed into AR device 102. For example, AR device 102 may be pre-programmed to recognize a verbal command of "goal getter" and initiate an application for displaying progress towards the goal when the verbal command "goal getter" is recognized and when the activating object is identified. In method 600, recognition of the "goal getter" command and identification of the activating object, for example a car or a key, identifies that progress towards the goal associated with the car or the key is to be displayed. In some implementations, a second activating command, for example "car," may be used. The second activating command may be used, for example, if the image of the activating object is not recognized at AR device 102.

At operation 608, an identity of the user of AR device 102 is identified. The identification is typically implemented by biometric recognition using one or more of facial recognition, retinal scan, voice recognition and finger print scan.

At operation 610, a request for information regarding progress towards a goal for the user is sent to a server computer, for example to server computer 104. The request for information typically includes an identifier for the user, an identifier for the activating object and one or more fields indicating that the request is for progress towards a goal for the user. The identifier for the user may be a financial account identification number, for example the user's bank account number or a unique identifier assigned to the user.

At operation 612, the goal information is received from the server computer. In some implementations, the goal information may include specific data fields for items such as amount of goal, amount saved for goal and percent saved for goal. The AR software application on AR device 102 may use this information to render a display of progress towards the goal. In other implementations, the goal information may include an XML (extensible markup language) file that implements a rendering of a goal object and an overlay showing progress towards the goal.

At operation 614, an image, similar to images shown in FIGS. 4 and 5, is displayed on AR device 102. When the goal information at operation 612 includes the specific data fields, the AR software application on AR device 102 uses the specific data fields to render the image showing progress towards the goal. The image showing progress towards the goal includes the goal object (for example the car, house, etc.) and includes a pattern or color overlay indicating a degree to which progress has been made to save money for the goal. When the goal information at operation 612 includes the XML or similar file, the image displaying progress towards the goal is rendered from the XML or similar file.

Figure 7:
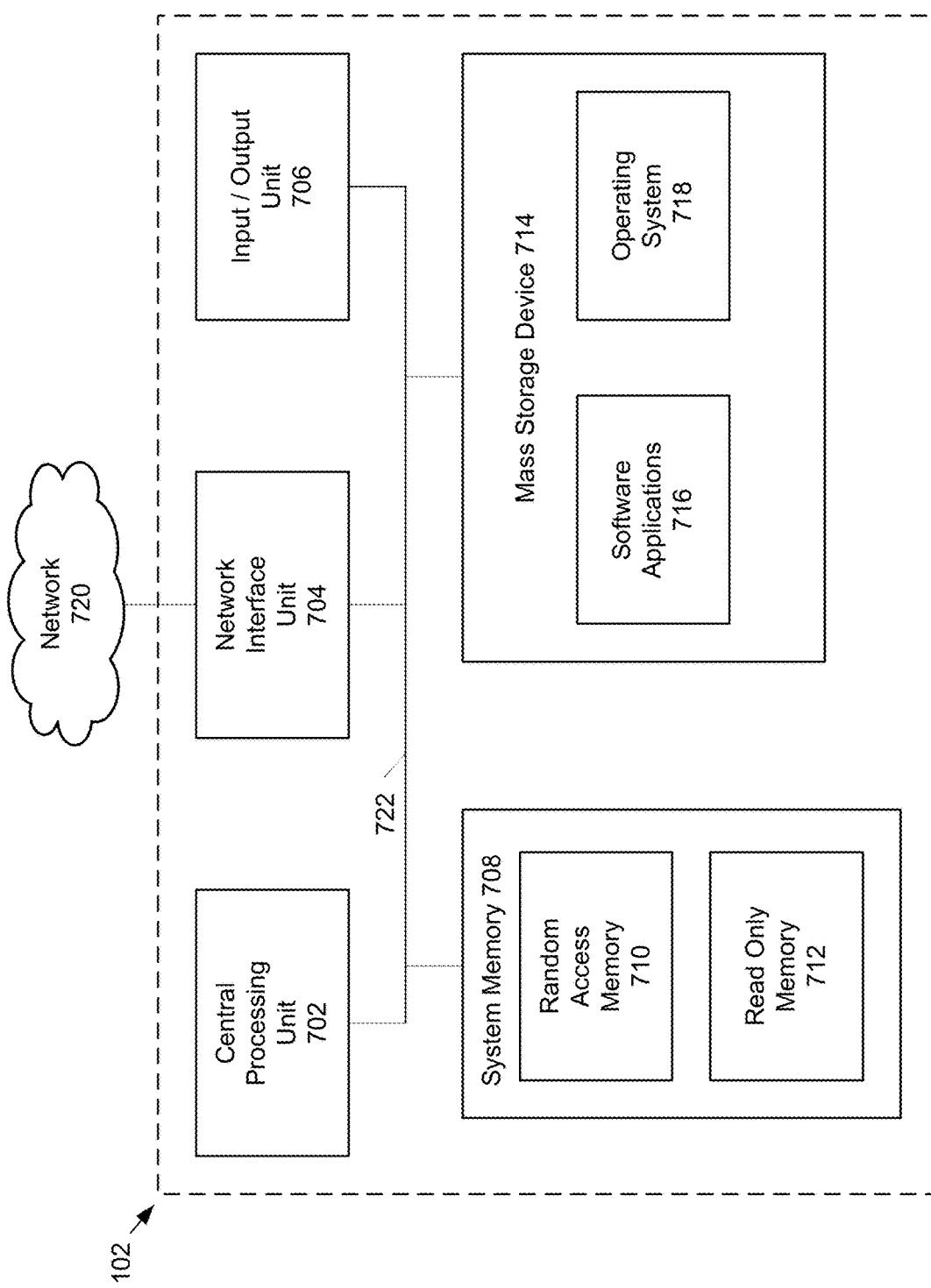
FIG. 7 shows example physical components of the AR device of FIG. 1.

As illustrated in the example of FIG. 7, the AR device 102 includes at least one central processing unit ("CPU") 702, a system memory 708, and a system bus 722 that couples the system memory 708 to the CPU 702. The system memory 708 includes a random access memory ("RAM") 710 and a read-only memory ("ROM") 712. A basic input/output system that contains the basic routines that help to transfer information between elements within the AR device 102, such as during startup, is stored in the ROM 712. The AR device 102 further includes a mass storage device 714. The mass storage device 714 is able to store software instructions and data. A central processing unit, system memory and mass storage device similar to that in FIG. 7 are also included in server computer 104.

The mass storage device 714 is connected to the CPU 702 through a mass storage controller (not shown) connected to the system bus 722. The mass storage device 714 and its associated computer-readable data storage media provide non-volatile, non-transitory storage for the AR device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the AR device 102.

According to various embodiments of the invention, the AR device 102 may operate in a networked environment using logical connections to remote network devices through the network 720, such as a wireless network, the Internet, or another type of network. The AR device 102 may connect to the network 720 through a network interface unit 704 connected to the system bus 722. It should be appreciated that the network interface unit 704 may also be utilized to connect to other types of networks and remote computing systems. The AR device 102 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the AR device 102 can store software instructions and data. The software instructions include an operating system 718 suitable for controlling the operation of the AR device 102. The mass storage device 714 and/or the RAM 710 also store software instructions/applications 716, that when executed by the CPU 702, cause the AR device 102 to provide the functionality of the AR device 102 discussed in this document. For example, the mass storage device 714 and/or the RAM 710 can store software instructions that, when executed by the CPU 702, cause the AR device 102 to display received financial data on the display screen of the AR device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an augmented reality (AR) device, the method comprising:
    viewing an object with the AR device, the object being an activating object that a user has previously selected from a list of objects displayed on a user interface of the AR device and configured to be associated with a goal of a user of the AR device, the goal being a purchase goal or a savings goal;
    receiving an image of the object at the AR device;
    identifying the object at the AR device;
    receiving one or more activating actions at the AR device; and
    as a result of the one or more activating actions:
        identifying the user of the AR device;
        sending the identity of the object and the identity of the user to a server computer;
        receiving information from the server computer regarding a percentage of completion towards the goal; and
        visually displaying an overlay on the object being viewed on the AR device, wherein the overlay includes a plurality of segments representing the percentage of completion towards the goal, wherein the overlay further comprises a plurality of colors or patterns, each of the plurality of colors or patterns covering a different segment of the viewed object, each distinct display of a color or a pattern indicating an incremental percentage towards the completion of the goal, each segment covering up a portion of the viewed object, each segment corresponding to a payment towards the goal for a time interval, the time interval for each of the plurality of segments being continuous and non-overlapping, the overlay having a shape substantially matching a shape of the segment of the viewed object being covered up.

2. The method of claim 1, wherein visually displaying the overlay further comprises displaying a line across the viewed object, a length of the line corresponding to the percentage completion towards the goal.

3. The method of claim 1, wherein the object is a three-dimensional object viewed by a camera on the AR device.

4. The method of claim 1, wherein the object represents an item configured to be associated with an item to be purchased.

5. The method of claim 1, wherein the object represents a task not related to an object to be purchased or the object represents an item configured to be associated with the task.

6. The method of claim 1, further comprising displaying a numerical indication of the percentage of completion towards the goal on the display screen of the AR device.

7. The method of claim 1, wherein a first activating action of the one or more activating actions comprises a command to activate an AR software application at the AR device.

8. The method of claim 7, wherein the command is a verbal command.

9. The method of claim 1, wherein the identity of the user is obtained by one or more of facial recognition, retinal scan, finger print scan or voice recognition.

10. The method of claim 1, wherein the AR device is a headset comprising a wearable computer with a camera and an optical head-mounted display.

11. The method of claim 1, wherein the AR device is a smart telephone having an AR software application.

12. An augmented reality (AR) electronic device, the AR electronic device comprising:
    a processor;
    a camera configured to capture an image of an object viewed by the camera, the object being an activating object that a user has previously selected from a list of objects displayed on a user interface of the AR electronic device and configured to be associated with a purchase goal of a user of the AR electronic device;
    memory in communication with the processor; and
    a display area,
    wherein, the processor is configured to:
    identify the object viewed by the camera;
    identify a user of the AR electronic device;
    send the identity of the object and the identity of the user to a server computer;
    receive information from the server computer regarding a percentage completion towards the purchase goal; and
    generate a visual display to be displayed in the display area at the location of the object while the object is viewed with the AR electronic device, the visual display representing progress towards the purchase goal, the visual display comprising an overlay based on the image of the object, the overlay covering at least part of the viewed object, the overlay comprising a plurality of colors or patterns, each of the plurality of colors or patterns covering a different segment of the viewed object and substantially matching an underlying shape of the object segment, an extent to which the overlay covers the at least part of the viewed object representing a percentage of a completion of the purchase goal, each distinct display of a color or a pattern indicating an incremental percentage towards completion of the purchase goal, each segment of the viewed object corresponding to a payment towards the purchase goal for a time interval, the time interval for each of the contiguous segments being continuous and non-overlapping.

13. The AR electronic device of claim 12, wherein the processor is further configured to execute one or more of facial recognition, retina recognition, voice recognition and finger print recognition to identify the user.

14. An augmented reality (AR) device comprising:
    a processing unit; and
    system memory, the system memory including instructions which, when executed by the processing unit, cause the AR device to:
    view an object, the object being an activating object that a user has previously selected from a list of objects displayed on a user interface of the AR device and configured to be associated with a savings goal of a user of the AR device;
    receive an image of the object;
    obtain an identification for the object, the identification being obtained at the AR device;
    receive one or more activating actions at the AR device, each of the one or more activating actions being a verbal command, the one or more activating actions initiating a display on the AR device of progress towards the savings goal; and as a result of the one or more activating actions:

identify the user of the AR device, the identification of the user of the AR device being performed via one or more of facial recognition, retinal scan, voice print or finger print scan;

send the identity of the user and the identity of the savings goal object to a server computer;

receive information from the server computer regarding a percentage of completion towards the savings goal; and visually display a different pattern or color on each of a plurality of segments of the viewed object, each pattern or color covering up one of the plurality of segments of the viewed object, each of the plurality of segments representing an incremental increase in a percentage towards a completion of the savings goal, each of the plurality of segments corresponding to a time interval at which the incremental increase in the percentage towards the completion of the savings goal occurred, the time interval for the plurality of segments being continuous and non-overlapping, each of the plurality of segments covering a portion of the underlying viewed object and substantially matching the shape of the underlying viewed object.

15. The AR device of claim 14, wherein the AR device is a headset comprising a wearable computer with a camera and an optical head-mounted display or a smart telephone having an AR software application.

* * * * *

UNITED STATES PATENT AND TRADEMARK OFFICE
CERTIFICATE OF CORRECTION

PATENT NO. : 9,652,894 B1
APPLICATION NO. : 14/278139
DATED : May 16, 2017
INVENTOR(S) : Weekly et al.

It is certified that error appears in the above-identified patent and that said Letters Patent is hereby corrected as shown below:

In the Claims

Column 13, Line 9 (Claim 14), "savings goal object" should read --object--

Signed and Sealed this
Twenty-seventh Day of March, 2018

Andrei Iancu
*Director of the United States Patent and Trademark Office*